Dec. 22, 1953  R. JACKSON  2,663,440
MOTORIZED HAND TRUCK
Filed Oct. 8, 1951  4 Sheets-Sheet 1

INVENTOR.
RODNEY JACKSON
BY
Cook & Robinson
ATTORNEYS

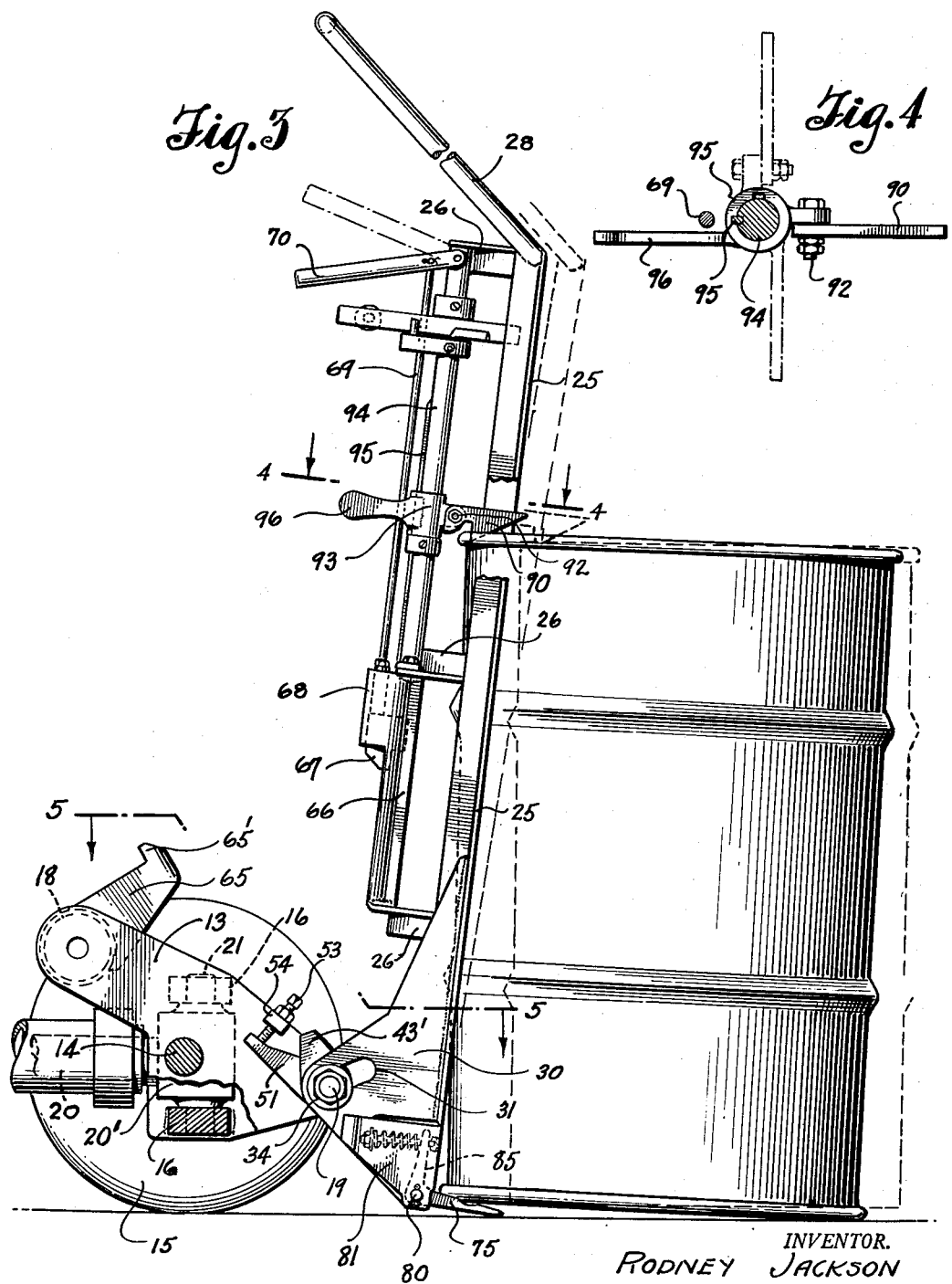

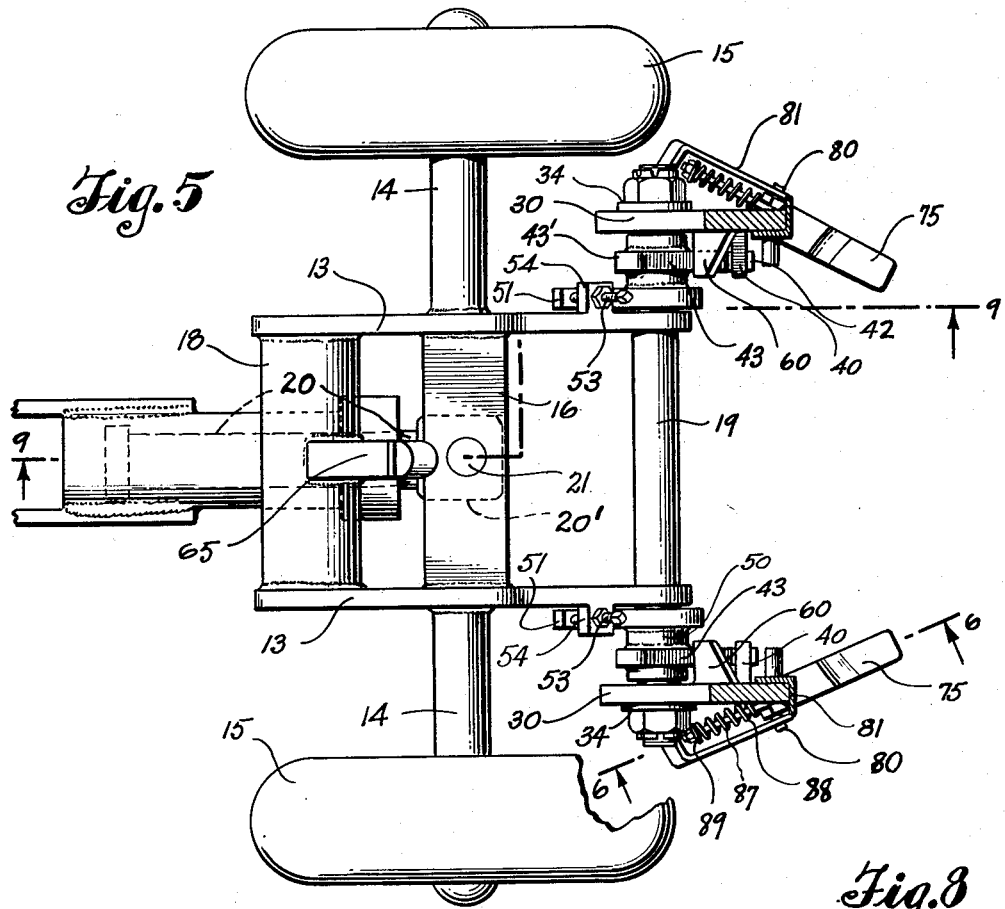

Dec. 22, 1953  R. JACKSON  2,663,440
MOTORIZED HAND TRUCK
Filed Oct. 8, 1951  4 Sheets-Sheet 4
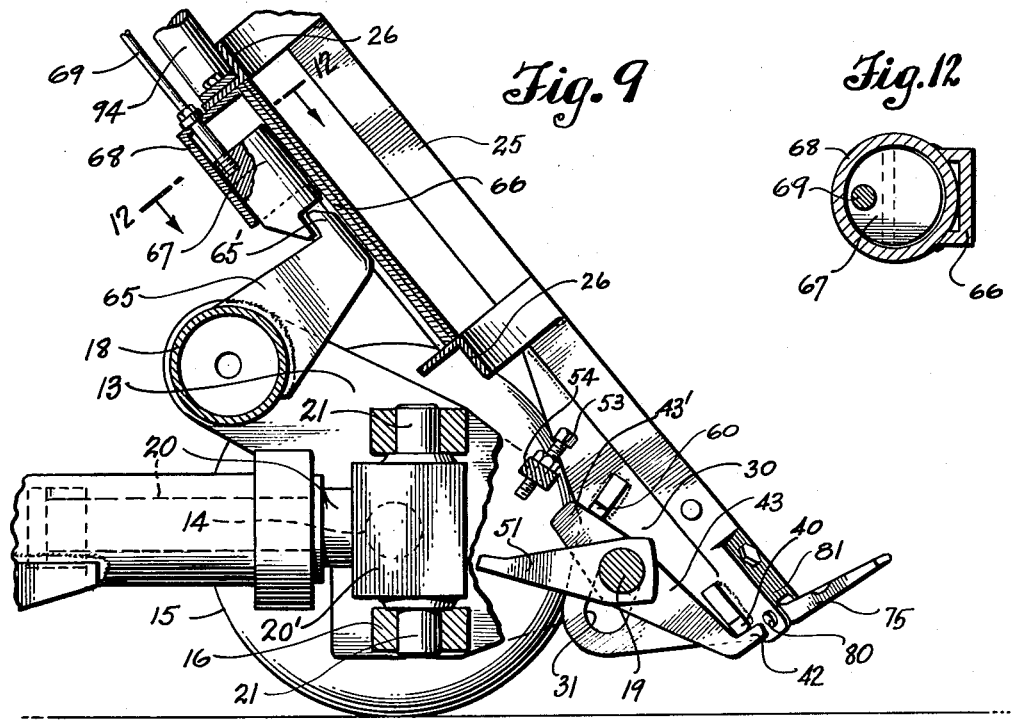
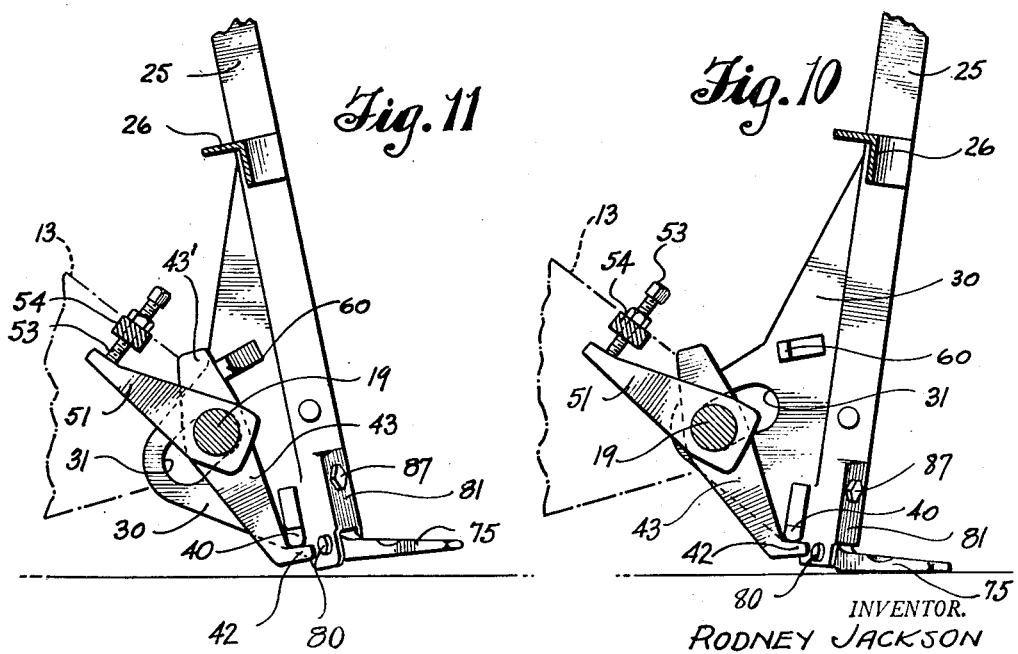
INVENTOR.
RODNEY JACKSON
BY
Cook r Robinson
ATTORNEYS Patented Dec. 22, 1953

2,663,440

UNITED STATES PATENT OFFICE 2,663,440

MOTORIZED HAND TRUCK

Rodney Jackson, Seattle, Wash., assignor to
Paul J. Isaacson and F. T. Isaacson

Application October 8, 1951, Serial No. 250,255

9 Claims. (Cl. 214—147)

This invention relates to motorized hand trucks, and it has reference more particularly to improvements in hand trucks of the general character of that disclosed in an application for patent filed by Dan A. Lyons, on November 7, 1947, under Serial No. 784,547, now U. S. Patent No. 2,570,256, wherein the truck is shown to comprise a chassis made up of articulated front and rear sections, with a front section equipped with a load carrier frame adapted to be moved from a substantially upright, load pick-up position to a rearwardly inclined position of rest for support of the load substantially balanced on the front section for transportation; the load carrier frame, in this position of rest, serving also as a means for the hand steering of the front end section of the truck by an operator while riding on the rear end section.

The principal object of this invention is to provide a hand truck of the above stated character that is especially adapted for the picking up and moving of barrels, although not limited thereto, and which invention is characterized by a novel arrangement of fulcrum supports for the load carrier frame when in loading position, that greatly facilitate that pivoting action of the carrier frame that is necessary for its initial pick-up movement of heavy objects. Furthermore, to provide a mechanism whereby the place of pivotal support for the load carrier frame is caused to be changed, with the forward inclining of the carrier frame to load pick-up position from a normally used shaft to these fulcrum supports.

It is a further object of the invention to provide a means of support at the forward end of the truck for the load carrier frame, that permits it to be swung from position of rest over the truck to a position substantially forwardly inclined from a vertical position, that is very advantageous in the picking up of barrels; at which forwardly inclined position the frame moves free from its normal pivotal support, and rests upon the fulcrum supports that provide for the greater load lifting leverage.

Yet another object of the present invention is to provide the load carrier frame with yieldably mounted load pick-up toes that, with the swinging of the carrier frame to load receiving position, will be pressed flatly against a floor surface for their easier projection beneath the article that is to be lifted.

Still further objects and advantages of the invention reside in the details of construction and combination of parts constituting or associated with the fulcrum supports, and in their mode of use as will hereinafter be fully described.

In accomplishing these and other objects of the invention, I have provided the improved details of construction, the preferred forms of which are illustrated in the accompanying drawings, wherein—

Fig. 3 is a side view of the load carrier frame as forwardly inclined for picking up and loading a barrel; certain parts being broken away for better understanding of construction.

Fig. 4 is a horizontal section, taken on the line 4—4 in Fig. 3.

Fig. 5 is a horizontal section of the parts seen in Fig. 3, the section being taken on the line 5—5 in Fig. 3.

Fig. 6 is a sectional detail on line 6—6 in Fig. 5 showing one of the pick-up toes of the load carrier frame and its mounting means.

Fig. 7 is a perspective view of one of the pick-up toes.

Fig. 8 is a perspective view of one of the fulcrum mounting lever assemblies.

Fig. 9 is a central vertical section of the front end portion of the truck and lower end portion of the load carrier frame, showing the latter in its position of rest for transportation of a load thereon.

Fig. 10 is a sectional detail, showing the load carrier frame as disposed in a forwardly inclined load pick-up position, and supported by the present fulcrum supports.

Fig. 11 is a similar view, showing the carrier frame in position for return to pivotal movement and support on the cross shaft, after the initial pick-up movement.

Fig. 12 is a cross-section of the frame latching mechanism taken on line 12—12 in Fig. 9.

Referring more in detail to the drawings—

Figure 1:
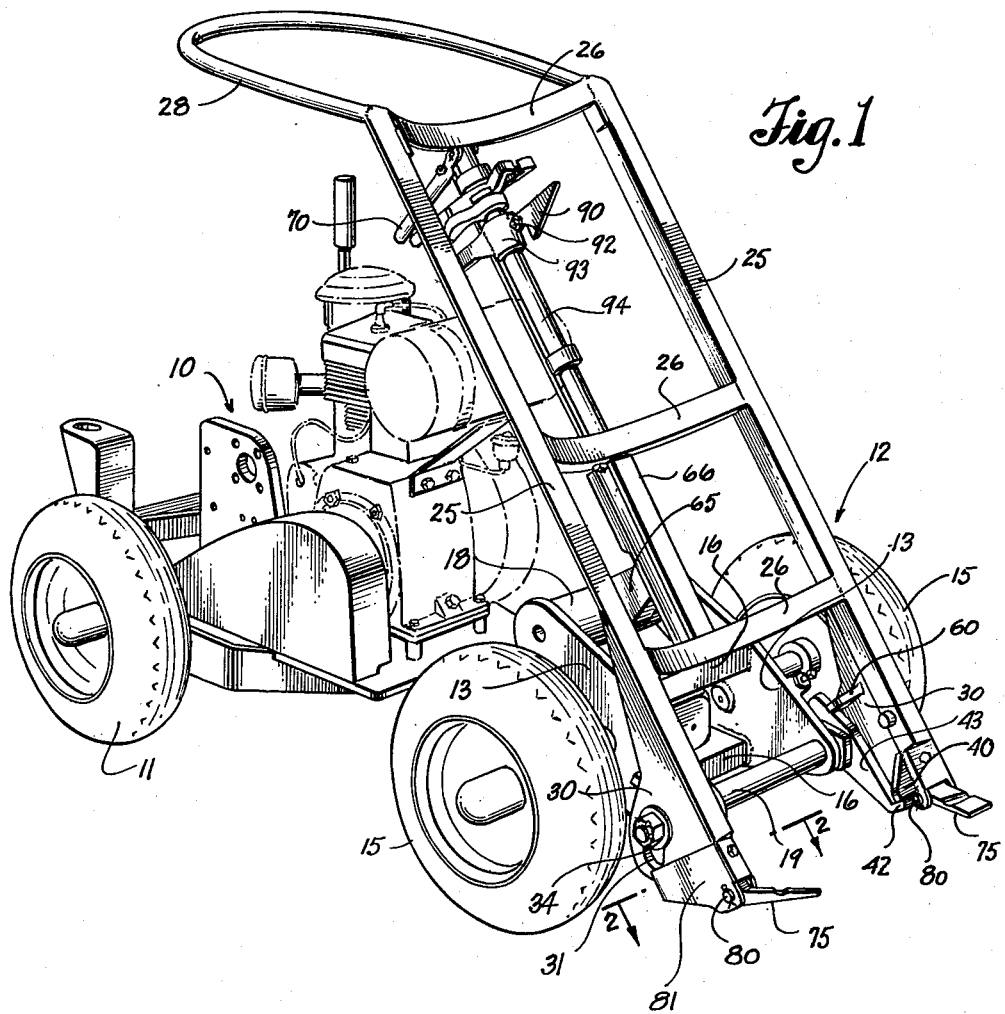
Fig. 1 is a perspective view of a hand truck embodying the improvements of the present invention therein.

The present invention is especially applicable to motorized hand trucks of the general character and construction of that illustrated in Figs. 1 and 3, which truck is especially designed for the moving of barrels, but it is not the intent that the invention be limited in any way by reason of this particular illustration of use. The truck, as herein shown, comprises a chassis having articulated rear and front end sections equipped with supporting and steering wheels after the fashion of the truck of the Lyons application previously mentioned or the truck of U. S. Patent No.

2,377,389 to Waters. Also, the front end section of the truck is steerable through the mediacy of a load carrier frame that is mounted thereon, and the load carrier frame is supported for pivotal movement between the forwardly inclined load pick-up position of Fig. 3, and the rearwardly reclining load transporting position of Figs. 1 and 9, as presently described.

It has been shown in the above mentioned Lyons application that the load carrier frame can be swung upwardly on a transverse pivot shaft from a rearwardly inclined position of rest to a substantially upright load pick-up position. The pivot shaft in that instance is most advantageously located for transportation purposes, but does not, in that location afford the leverage advantage that is best for the initial or pick-up movement of heavy loads. Therefore, it has been the primary purpose of this construction to provide a truck having a cross shaft serving as the normal pivotal support for the frame, and located in a position corresponding substantially to the position of the shaft in the Lyons application, but which is supplemented by fulcrums that become effective as supports for the load carrier frame upon its being inclined forwardly to a load pickup position and which by reason of location, give a greatly increased advantage in leverage that results in easier initial pick-up of the load, and manual movement of the load carrier frame to a rearwardly inclined position, at which the cross-shaft again becomes effective as its supports.

In Fig. 1 of the drawings, the rear section of the truck is designated generally by reference numeral 10, and it is supported and driven by ground wheels as designated at 11. The front end section is designated generally by numeral 12 and it comprises a rigid frame structure having vertically disposed, laterally spaced opposite side plates 13—13, from which stub axles 14—14 extend in transverse alignment, and which axles mount supporting and steering wheels 15—15 thereon. The frame structure also includes vertically spaced, horizontal cross-bars 16—16 which rigidly join the plates 13—13 at their medial portions, a tubular cross-member 18 joining them at their rearward ends, and a cross shaft 19 joining them at their forward ends; this shaft being disposed relatively close to the truck supporting surface, and the member 18 being substantially high as will be noted by reference to Fig. 9.

The front and rear sections of the chassis are pivotally joined by means best shown in Fig. 9 to include a horizontal swivel spindle shaft 20 which, at its forward end has a squared head 20' contained between the cross-bars 16—16 and is there equipped with vertically aligned pivot studs 21—21 contained in holes formed therefor in the cross-bars. In the construction as shown in Figs. 5 and 9, the tubular cross member 18 is above the draw bar connection and rearward of the axial line of the wheels 15—15 while the cross shaft 19 is below the line of the draw bar and just forward of axial line of the wheels 15—15. In a truck now in use, the cross-shaft 19 is located about eight inches above the surface on which wheels travel, and as has been shown in Fig. 5, it extends through and beyond the supporting side plates 13—13 in which it is fixed.

The load carrier frame is pivotally mounted on the outer end portions of cross-shaft 19 as shown in Fig. 1. This frame comprises coextensive, opposite side beams 25—25, joined in spaced relationship by cross-bars 26 as best shown in Fig. 1. Fixed rigidly to the upper ends of the side beams 25—25, is a rearwardly extended, rigid loop 28 which is grasped by the operator and used for the hand steering of the truck through the mediacy of the load carrier frame and front end frame structure to which it is secured.

It is shown in Fig. 1 that the opposite side beams 25—25 of the carrier frame are formed along their lower end portions with downwardly directed webs or flanges 30, and these are provided with arcuate slots 31 through which the ends of the cross-shaft 19 extend. At its ends the cross-shaft is equipped with washers and nuts, as at 34, to secure the carrier frame thereon.

By reference more particularly to Figs. 9, 10 and 11, it will be understood that the arcuate slots 31 are disposed in the webs 30 in such spaced relationship to the lower end of the beams 25—25, that when the carrier frame is in a vertical upright position, or rearwardly inclined therefrom, as in Fig. 9 or 11, the beams will be supported on the cross-shaft 19 by reason of its seating against the upper ends of the arcuate slots. However, if the carrier frame is so moved as to be inclined forwardly from the vertical position, its points of support change from the cross-shaft 19 as engaged against the upper end of the web slots 31 to lugs 40 that are welded or otherwise fixed to the webs immediately adjacent the lower end of the side beams, and which extend inwardly therefrom and are adapted to then seat pivotally upon forwardly and upwardly directed toe portions 42 of levers 43 that are supported from the outer ends of the cross-shaft 19 and extend downwardly and forwardly therefrom to such extent that the parts 42, when in functional use, are located closely adjacent the ground surface.

After the lugs 40 have thus been initially brought into contact with the supports 42, any further forward tilting of the carrier frame causes it to be supported entirely by the lugs 40—40 as resting on the toes 42 of the lever arms 43, and the forward inclination can be continued until the lower ends of the arcuate slots 31 engage with the cross-shaft 19 as has been shown in Fig. 10. The position of the supporting toes 42—42 is such that the lower ends of the beams 25—25 will at all times be held clear of the ground surface. It is preferred that, in their lowest positions there be about ⅜" clearance.

The spacing of the supports 42 from the ground surface can be changed by a rotary adjustment of the arms 43 on the supporting shaft 19. To provide for such adjustment, each arm 43 is fixedly mounted on a short sleeve 50 as seen in Fig. 8, that is revolubly fitted to the corresponding end portion of the shaft 19 between the side plates 13—13 of the front frame and the webs 30—30 of the carrier frame. Also fixed to each sleeve is an upwardly and rearwardly extending lever arm 51 adapted to be stopped in its upwardly swinging travel by contact with a stop bolt 53 that is adjustably mounted in a lug 54 that extends outwardly from the adjacent side plate 13 of the frame of the front section 12; these parts being well shown in Figs. 9, 10 and 11. By reason of the rigid assembly of parts 43, 50 and 51, the engaging of the arms 51 with the stop bolts 53, which is adjustably mounted, establishes the elevation of the parts 42.

With the swinging of the load carrier frame to its rearwardly inclined load carrying position, in which it is seen in Fig. 9, and at which position it is supported on the cross-shaft 19, it is desired that the lever arms 43 be swung upwardly out of the way of objects over which the truck might pass. Therefore, to automatically accomplish this result, the lever arms 43 have their upper end portions 43' extended somewhat above the shaft 19, and lugs 60 are fixed on the webs 30 in such position that with the lowering of the load carrier frame to its rearwardly inclined position of rest, they will engage the upper ends 43' of the levers 43 and swing them toward a horizontal position substantially above the ground lever as shown in Fig. 9.

As a means for retaining the load carrier frame in its rearwardly inclined position of rest, as in Figs. 1 and 9, I provide an upwardly and forwardly directed hook 65 on the cross member 18, against the upper end of which hook a longitudinally extended center bar 66, that is fixed to cross members 26 of the carrier frame, can be brought to rest. The toe 65' of the hook 65 is upwardly and rearwardly directed and is adapted to be engaged by a latch 67 that is slidably contained in a tubular holder or housing 68 fixed to bar 66. A pull rod 69 is attached to the latch 67 and is extended upwardly to the upper end of the carrier frame and there equipped with an operating lever 70.

Figure 2:
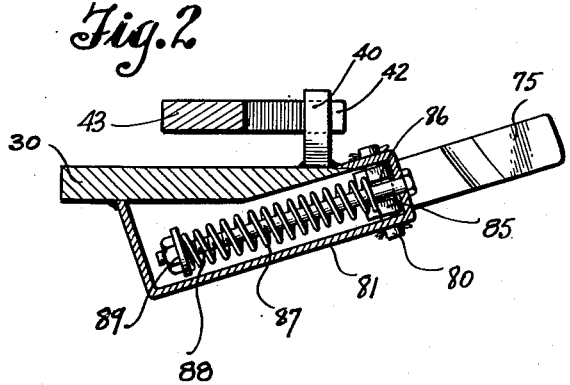
Fig. 2 is an enlarged, cross-sectional view taken on line 2—2 in Fig. 1, particularly illustrating the spring tensioning means for the load pick-up toes at the lower end of the load carrier frame.

For the pick-up of a barrel or similar object by the load carrier frame, there is provided at the lower ends of the side beams 25—25, the forwardly and inwardly directed toes 75—75 well shown in Figs. 1 and 5. These toes are of the form best shown in Figs. 6 and 7, each comprising a flat wedge-like bar, tapered to a flat, rounded forward end point for their easy projection beneath the edge of the barrel as indicated in Fig. 3. At their inner ends the toe bars are pivotally mounted on bolts 80 passed horizontally through the inner and outer walls of housings 81 applied to the lower ends of the frame beams as shown in Figs. 2 and 5. Each toe lever is formed at its inner end with an upwardly directed lever arm 85, with upwardly opening notches 86 in their upper ends. Extended through these notches and anchored in the front walls of the housings, as shown best in Fig. 2, are bolts 87. Coiled springs 88 are applied about the bolts and secured by nuts 89 to bear against the arms 85 thus to urge the toes downwardly into contact with a floor surface by the swinging of the carrier frame to vertical position. Then, with a continued forward movement, as to position of Fig. 10, the springs yield, and the carrier frame is not caused to be lifted by reason of the toes.

Mounted in the upper end portion of the carrier frame, in the central longitudinal plane thereof, is a shaft 94. This extends between and is fixed to the cross-members 26—26 of the carrier frame. Slidably mounted on this shaft is a collar 93, and pivotally attached to a lug 93' that extends forwardly from the collar, by means of a pivot bolt 92, is a latch hook 90 adapted to be used as a barrel loading and securing means. The collar 93 is held against rotation on the shaft by a key 95 shown in Fig. 4, that extends along the shaft to near its upper end support. A handle 96 extends rearwardly from the collar, by means of which it can be slid along the shaft to a position above the key and then turned to dispose the hook out of the way of articles carried on the frame which do not require holding. The collar is formed with an additional keyway 98, as seen in Fig. 4, to receive the key 95 when in this latter position.

For the loading of a barrel onto the truck, and assuming that it is disposed in the upright, dotted line position of Fig. 3, the operator tilts the frame forward and engages the hook 90 with the chime of the barrel. He then pulls the carrier frame rearwardly and in doing this the barrel is tilted accordingly, while still resting on that lower edge portion thereof that is adjacent the carrier and medial of the toes 75—75. With the tilting of the barrel, a space is opened up between the lower chime and the ground into which, upon the forward movement of the truck, the toes 75—75 will enter beneath the barrel. Then by tilting the carrier frame rearwardly, the barrel will be picked up by the toes and supported in this inclined position for transportation. It is to be noted further that with the lifted load in a position approaching balance over the cross-shaft 19, the fulcrum support changes from parts 42 to the cross-shaft 19, with a substantial part of the load forwardly of shaft 19 to counterbalance that which is rearwardly thereof, so that the operator has no difficulty in the handling of exceedingly heavy objects. In its final position of rest, the load will be substantially balanced over the axial line of the supporting and steering wheels 15—15. This makes steering control easier.

While the device has been shown as designed more particularly for the handling of barrels, it is anticipated that it be used also for moving of boxes, crates and other objects for which the carrier frame is applicable either as it is shown or as equipped with carrier plates of various kinds that can be readily applied to the carrier frame.

Having thus described my invention, what I claim as new therein and desire to secure by Letters Patent, is—

1. A truck of the character described comprising a chassis, a cross-shaft fixed in said chassis, a load carrier frame having opposite side members formed with arcuate slots, at distances spaced from its lower end and containing said cross-shaft therein, and against the upper ends of which slots said shaft is adapted to engage for the tilting adjustment thereon of the load carrier frame between a rearwardly inclined, load carrying position and a substantially upright load pick-up position, lugs fixed to the load carrier frame at its lower end, arms mounted on the said chassis and extended to positions for the engagement therewith of said lugs when the load carrier frame is adjusted to said upright load pick-up position, and for the pivotal support of the said load carrier frame thereon for forward tilting, free of support by the cross-shaft; said arcuate slots being centered about the axial line of said lugs, and adapted to limit the extent of forward tilting of the load carrier frame as supported by said lugs.

2. A structure as in claim 1 wherein the load carrier frame is equipped at its lower end with pivotally mounted and forwardly extended load pick-up fingers, and with positive stops to limit the relative downward hinging of the said pick-up fingers, and yieldable means operable to urge them toward their downward limit.

3. A truck of the character described comprising a chassis, a cross-shaft fixedly mounted therein, a load carrier frame having opposite side members formed with slots receiving said shaft therethrough for the pivotal support of the load carrier frame thereon in tilting movement between a rearwardly inclined load carrying position, a lever arm pivoted on the said cross-shaft and extended along the load carrier frame above the cross shaft and below it to near ground level, stop means on the chassis for limiting the downward arcuate movement of the lower end portion of the said lever arm; said lever arm having a toe portion at its lower end, a lug on the lower end of the load carrier frame adapted to engage with said toe for the pivotal support of the load carrier frame thereon, free of the cross-shaft, in a tilting adjustment thereof in an arc forwardly of the said substantially upright position, as provided for by the said slots and forwardly directed load pick-up means on the lower end of the load carrier frame.

4. A structure as recited in claim 3 wherein a lug is applied to the load carrier frame, to engage with the upper end portion of the lever arm when the load carrier frame is tiltably adjusted on the said cross-shaft to the rearwardly inclined load carrying position, to cause the lower end of the lever arm to swing upwardly and away from the ground level.

5. A structure as recited in claim 3 wherein the means for limiting the downward movement of the lower end portion of said lever arm comprises a lever that is fixed to and extends from the said lever arm, and a set screw adjustably mounted in chassis and adapted to be engaged by the said lever, said screw being adjustable to effect a change in limit of downward swing of the toe portion of the said lever arm.

6. In a truck of the character described, a chassis, a pivot member fixed therein at a distance substantially above the surface on which the truck operates, load pick-up supports on the chassis disposed forwardly of the said pivot member and at a lower level, substantially close to the said surface, a load carrier frame equipped with forwardly directed load pick-up fingers at its lower end and there being means fixed to said load carrier frame above its lower end and normally resting on said pivot member for the support and tilting adjustment of the load carrier frame thereon between a rearwardly inclined load carrying and a substantially upright position, and fulcrums fixed on said load carrier frame adjacent its lower end adapted to move into frame supporting contact with said load pick-up supports for pivotal support of said carrier frame thereon as it is adjustably tilted between said substantially upright position and a forwardly inclined load pick-up position.

7. A combination as in claim 6 wherein the load pick-up fingers are pivotally hinged to the load carrier frame, and means provided in association therewith for limiting their relative downwardly hinging movement, and permitting their relative upward hinging movement when brought into surface contact by tilting of the load carrier frame forwardly from said substantially upright position.

8. A combination as in claim 6 including also a load engaging latch mounted on the load carrier frame for adjustment therealong from and toward the pick-up fingers.

9. In a truck of the character described, a chassis, a load carrier frame pivotally supported thereon for tilting adjustment between forwardly inclined load pick-up position and rearwardly inclined load carrying position, load pick-up fingers at the lower end of said carrier frame, a shaft fixed in the carrier frame and extended therealong, a collar slidable on the shaft for movement therealong, a hook pivoted on the collar for engaging the upper end of a load as supported on said fingers, a key extending along the shaft, and said collar being adapted to receive the key to prevent its rotation on the shaft, and a rearwardly extending handle on the collar whereby it is adapted to be lifted above the key and rotatably adjusted to disposed the latch away clear of the load.

RODNEY JACKSON.

References Cited in the file of this patent

UNITED STATES PATENTS

| Number | Name | Date |
|---|---|---|
| 1,201,957 | Hall | Oct. 17, 1916 |
| 1,379,472 | Morgan et al. | May 24, 1921 |
| 1,827,209 | Robbins | Oct. 13, 1931 |
| 2,251,435 | Anthony | Aug. 5, 1941 |
| 2,377,389 | Waters | June 5, 1945 |
| 2,485,085 | Burch | Oct. 18, 1949 |
| 2,570,256 | Lyons | Oct. 9, 1951 |
| 2,598,515 | Dickson | May 27, 1952 |